Aug. 20, 1946.   J. GALTER   2,406,071
CIGAR AND CIRARETTE LIGHTER
Filed July 9, 1945

Inventor:
Jack Galter:
by James R. McKnight
Attorney.

Patented Aug. 20, 1946

2,406,071

UNITED STATES PATENT OFFICE 2,406,071

CIGAR AND CIGARETTE LIGHTER

Jack Galter, Chicago, Ill.

Application July 9, 1945, Serial No. 603,893

1 Claim. (Cl. 67—7.1)

This invention relates to lighters adapted to function regardless of heavy winds, and used for the lighting of cigars and cigarettes.

Among the objects of my invention is to provide a windproof lighter having a closure adapted to easily and definitely open and close as desired and to prevent undesired closing; to supply a closure providing a good seal; to provide a container and casing so formed that the container is easily removable from the casing but will not rattle when in position in the casing; to create a construction eliminating unnecessary parts; and such other objects advantages and capabilities as will later more fully appear and which are inherently possessed by my invention.

While I have disclosed herein certain preferred embodiments of my invention, yet I wish it understood that the same are susceptible of modification and change without departing from the spirit of my invention.

Figure 1:
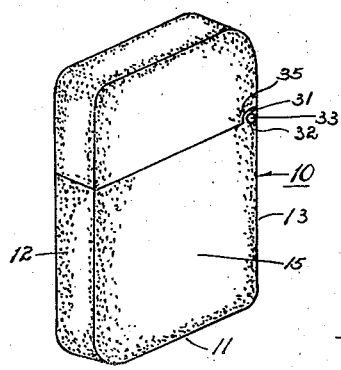
Figure 2:
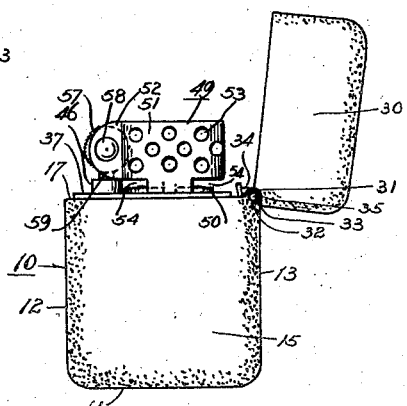
Figure 3:
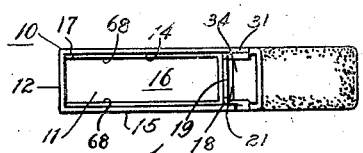
Figure 4:
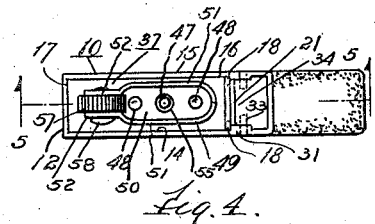
Figure 5:
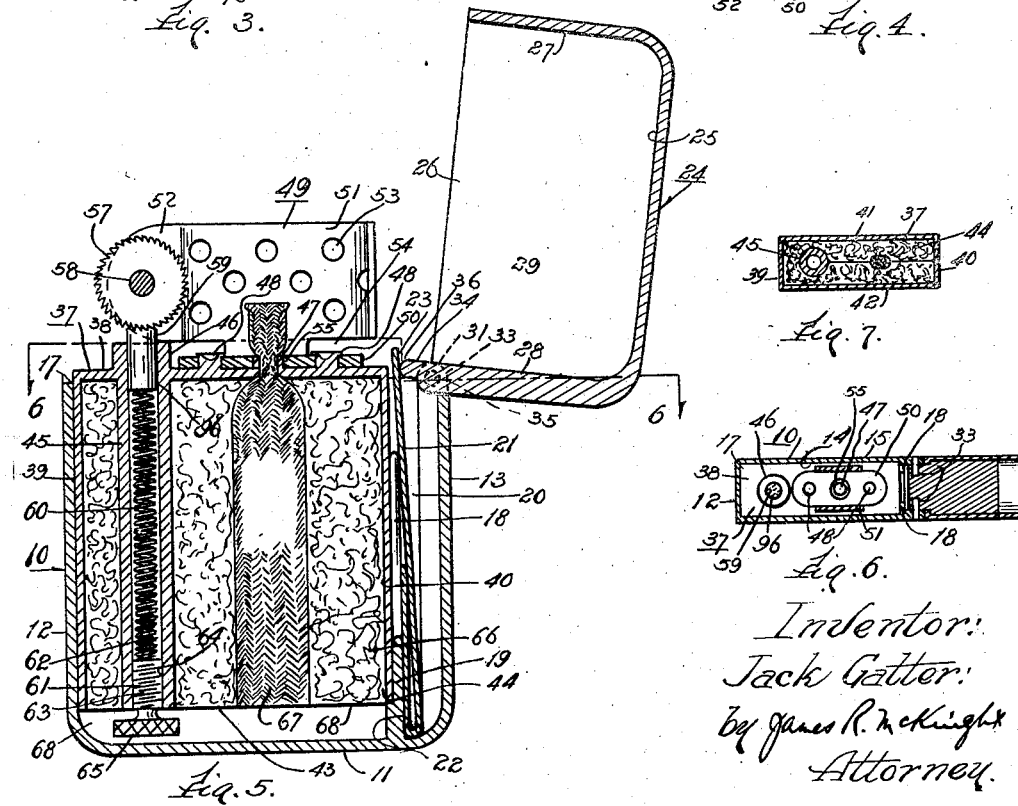
Figure 7:
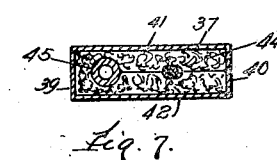
Figure 6:
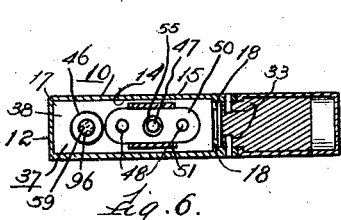

Referring to the drawing, Fig. 1 is a perspective view of the exterior of my device; Fig. 2 is a side elevational view with the cover open; Fig. 3 is a top plan view of the casing; Fig. 4 is a top plan view of the device; Fig. 5 is an enlarged sectional view on line 5—5 of Fig. 4; Fig. 6 is a sectional view on line 6—6 of Fig. 5; Fig. 7 is a bottom plan view of the packing.

The embodiment selected to illustrate my invention comprises a casing 10 having a closed bottom 11, a front wall 12, and a rear wall 13, an inner side wall 14 and an outer side wall 15 forming a hollow interior 16 and an open top 17. Adjacent the inner wall 14 but slightly spaced therefrom are ribs 18 integrally formed in the inner surfaces of front and rear walls 12 and 13. Said ribs are connected at their bottom portions by integral connecting portion 19, on bottom 11. The ribs 18 and connecting portion 19 form with inner side wall 14 a chamber 20 which houses leaf spring 21. Said spring is bent on itself about one third from its bottom, with the lower double portion 22 within the lower portion of chamber 20 and the upper end 23 extending through open top 17 a short distance above the walls of the casing. The lower portion 22 of the spring 21 is bent slightly outwardly so as to bear against the ribs 18 so that the spring 21 is self fastening within chamber 20, and ribs 18 act as an anchor for the spring 21.

A cover 24 has a closed top 25, open bottom 26, and complementary front 27, rear 28, inner side 29 and outer side 30 walls.

My cover 24 is hinged to casing 10 as follows. The upper inner corners of front and rear walls 12 and 13 have ears 31 with openings 32 therein to pivotally receive the opposite ends of pivot pins 33 which are embedded in cam 34 which is integrally formed as an extension at the inner end of inner side wall 29 on cover 24. The front and back walls 27 and 28 of cover 24 have rounded cut out portions 35 to correspond with rounded ears 31.

The cam 34 has a radius 36 at its free end. In use when the cover 24 is pivoted to open position on casing 10, radius 36 rides upwardly on spring 21 until the radius is above center. Then the spring 21 bears against the under portion of radius 36 and holds the cover in open position by spring pressure. During the pivoting of cover 24 to closed position, radius 36 rides downwardly on spring 21 until past the half way mark. Then spring 21 bears against the upper of radius 36 and holds the cover in closed position by spring pressure.

A removable container 37 has a closed top 38, front and back walls 39 and 40, and inner and outer side walls 41 and 42. An open bottom 43 leads to a hollow interior 44.

Within interior 44 is integrally formed a flint tube 45 extending from the bottom to a boss 46 in the top 38, which has an opening 96. A wick hole 47 extends through top 38. On either side of hole 47 are a pair of spaced lugs 48 integrally formed in top 38.

A flame guard 49 has a base 50, high opposite side walls 51 curved to meet at one end, and ending at the other end in a pair of spaced lugs 52. The side walls 51 have a plurality of opposite spaced holes 53, and bottom cut out draft portions 54. The base 50 is mounted on top 38 of container 37. The base has a central wick opening 55 positioned to register with wick hole 41 in container 37. The base 50 also has a pair of smaller openings 56 spaced on either side of wick opening 55 and adapted to receive lugs 48. The lugs 48 are then peened over to hold flame guard 49 on container 37.

A knurled wheel 57 is rotatably mounted on pin 58 extending between and attached to lugs 52, and positioned to strike against flint 59 extending out of opening 46 in boss 45.

Within flint tube 45 is a coiled spring 60, the upper end of which contacts flint 59 and holds it to extend through opening 46 to contact wheel 57. An adjustment screw 61 has its upper shank 62 positioned within spring 60 and has screw threads 63 to engage the screw threads 64 in the lower end of tube 45, and an enlarged end 65.

A packing 66 is split to receive the lower portion of a wick 67, both of which extend within interior 44 of container 37. Lighting fluid or other suitable liquid fluid is added to the packing and the wick. The upper end of wick 67 extends through openings 47 and 55 for lighting upon receiving a spark from the flint caused by turning the wheel thereagainst.

The front and back walls 12 and 13 of casing 10 have low horizontal ribs 68 at their bottom portions, so that when container 37 is placed in the interior 16 of casing 10, the ribs 68 prevent the container 37 and screw 61 from touching the bottom 11. The container is held in position by friction grip against the front and rear walls 12 and 13, the outer side wall 15 and ribs 18.

Having thus described my invention, I claim:

In a cigar and cigarette lighter a casing having closed bottom, front, back, outer and inner side walls and an open top, a pair of spaced ribs formed in the front and back walls, said ribs slightly spaced from the inner side wall, and a connecting member connecting the bottom portions of said ribs, said ribs, connecting member and adjacent portions of the inner side wall, the front, back and bottom walls forming a chamber, a leaf spring positioned within said chamber, said spring bent on itself about a third from its bottom, with the double portion of the spring positioned in the lower portion of said chamber, the lower end of said spring bent to contact said ribs, the upper end of said spring extending slightly beyond the open top of said casing, said front and back walls having integral ears extending from their upper inner corners, a cover having corresponding closed top, front, back and inner and outer side walls, a cam extending beyond and formed integrally with said inner side wall, pivot pins embedded in said cam and extending within said ears to pivotally hinge said cover to said casing, said cam having a radius adapted to engage said spring for holding said cover in desired open and closed positions, said hollow interior of said casing adapted to removably receive a fuel can, said chamber confining said spring and preventing its entry into said hollow interior and interference with the free ingress and egress of the fuel can.

JACK GALTER.